US005680509A

United States Patent [19]
Gopalakrishnan et al.

[11] Patent Number: 5,680,509
[45] Date of Patent: Oct. 21, 1997

[54] METHOD AND APPARATUS FOR ESTIMATING PHONE CLASS PROBABILITIES A-POSTERIORI USING A DECISION TREE

[75] Inventors: Ponani S. Gopalakrishnan, Yorktown Heights; David Nahamoo, White Plains; Mukund Padmanabhan, Ossining; Michael Alan Picheny, White Plains, all of N.Y.

[73] Assignee: International Business Machines Corporation, Armonk, N.Y.

[21] Appl. No.: 312,584

[22] Filed: Sep. 27, 1994

[51] Int. Cl.$^6$ ............................................. G10L 5/06
[52] U.S. Cl. .................... 395/2.49; 395/2.54; 395/2.64
[58] Field of Search ........................... 395/2, 2.4, 2.49, 395/5.54, 2.6–2.65, 2.51; 381/43

[56] References Cited

U.S. PATENT DOCUMENTS

| | | | |
|---|---|---|---|
| 4,759,068 | 7/1988 | Bahl et al. | 395/2.51 |
| 4,852,173 | 7/1989 | Bahl et al. | 381/43 |
| 5,033,087 | 7/1991 | Bahl et al. | 395/2.54 |
| 5,263,117 | 11/1993 | Nadas et al. | 395/2 |
| 5,267,345 | 11/1993 | Brown et al. | 395/2.64 |

OTHER PUBLICATIONS

L. R. Bahl et al, "A Fast Approximate Acoustic Match for Large . . . " IEEE Trans. on Speech & Audio Processing. V. 1 #1 Jan. 93 pp. 59–67.
A. Nadas et al "An iterative flip–flop approximation of the . . . " Proc. of International Conf. on Acoustics, Speech etc. '91 pp. 565–568.

Primary Examiner—Kee M. Tung
Attorney, Agent, or Firm—Robert P. Tassinari, Jr.

[57] ABSTRACT

A method and apparatus for estimating the probability of phones, a-posteriori, in the context of not only the acoustic feature at that time, but also the acoustic features in the vicinity of the current time, and its use in cutting down the search-space in a speech recognition system. The method constructs and uses a decision tree, with the predictors of the decision tree being the vector-quantized acoustic feature vectors at the current time, and in the vicinity of the current time. The process starts with an enumeration of all (predictor, class) events in the training data at the root node, and successively partitions the data at a node according to the most informative split at that node. An iterative algorithm is used to design the binary partitioning. After the construction of the tree is completed, the probability distribution of the predicted class is stored at all of its terminal leaves. The decision tree is used during the decoding process by tracing a path down to one of its leaves, based on the answers to binary questions about the vector-quantized acoustic feature vector at the current time and its vicinity.

11 Claims, 4 Drawing Sheets

METHOD AND APPARATUS FOR ESTIMATING PHONE CLASS PROBABILITIES A-POSTERIORI USING A DECISION TREE

FIELD OF THE INVENTION

The invention relates to speech recognition systems, and in particular to the estimation of phone class probabilities in such systems.

BACKGROUND OF THE INVENTION

The estimation of phone probabilities is an essential part of any speech recognition system. Typically, the recognition is carried out in a maximum likelihood framework, where the probability of a given acoustic feature vector, conditioned on the phone is computed (i.e., P(acoustic/phone)). Subsequently, for all words in the vocabulary, the recognizer hypothesizes that the word is the correct word and computes a probabilistic score for this word on the basis of these probabilities, and then chooses the word with the highest score to be the correct one. This probability is typically computed in most schemes using only a very limited acoustic context. This is done by making up a feature vector at every frame by splicing together the original acoustic vector at that frame and in the adjacent few frames. However, the extent of the acoustic context that can be considered in this scheme is limited, because as the dimension of the feature vector is proportional to the size of the context, using a very large context to define the feature vector makes it prohibitively large and computationally very expensive.

This invention proposes an alternative scheme to enable the use of adjoining acoustic context, at a very small cost, to predict a probability of the phone classes at any given time. The invention uses a nonlinear decision-tree-based approach to solve this problem. The quantized feature vectors at, and in the vicinity of, a current time are used to predict a probability distribution of the phone classes, with the mechanism of prediction being a decision tree. The decision tree is constructed from training data by designing binary questions about the predictors such that the uncertainty in the predicted class is minimized by asking the question. The technique described in A. Nadas and D. Nahamoo, "Method and Apparatus for Finding the Best Splits in a Decision Tree for a Language Model for a Speech Recognizer", U.S. Pat. No. 5,263,117, issued Nov. 16, 1993, ("Nadas") is used to design these questions for each predictor and is incorporated herein by reference.

This invention also describes a method whereby the probabilities so calculated are used in conjunction with the maximum-likelihood framework to cut down the search space of the speech recognizer.

SUMMARY OF THE INVENTION

It is an object of the invention to take the given vector-quantized feature vectors at the current time t, and the adjacent N time frames on either side, and devise a decision-tree that maps them to a distribution over the phone classes. Hence, the training data used for the construction of the decision tree consists of sets of records of 2N+1 predictors and the associated class (which is assumed to be known). The alphabet size of each predictor is in the hundreds, and the class alphabet size is also typically quite large (50 or so).

The invention uses a successive data partitioning and search strategy to determine the questions of the decision tree. Starting with all the training data at the root of the tree, the invention chooses one of the 2N+1 predictors and partitions the alphabet of the predictor into two non-overlapping sets. Subsequently, for all the training records at the current node, if the value of the chosen predictor lies in the first set, the record is assigned to the first set; otherwise it is assigned to the second set. Hence, the training data at the current node is distributed between two child nodes on the basis of the set membership of the selected predictor. The predictor and the partitioning of the alphabet are chosen in such a way that after the training data is partitioned as described above, the uncertainty in the predicted class is minimized. The procedure is repeated for each child of the current node, until the class uncertainty at a node (quantified by the entropy of the class distribution at the node) falls below a certain level, or until the amount of training data at a node falls below a certain level. After the tree is constructed, the phone class distribution at the terminal nodes of the tree is available, and is stored along with the questions of the tree.

For the case of a single predictor, Nadas describes a technique to find the best binary question that minimizes the uncertainty in the predicted class. At the current node, this technique is applied independently to each of the 2N+1 predictors, and the best question for each predictor is determined. Subsequently, the best one among the 2N+1 predictors is determined as the one that provides the maximum reduction in class uncertainty, and the question at the current node is formulated as the best question for this best predictor. Alternatively, the question at a node could also be made more complex, such that it depends on more than one predictor, or an inventory of fixed complex questions could be used, and the best question chosen as the one in this inventory that provides the maximum reduction in class uncertainty.

It is another object of the invention to describe means whereby the above described decision tree can be used in a speech recognizer. During recognition, the decision tree is traversed until it reaches one of the terminal nodes, and the phone class distribution at the terminal node of the decision tree is taken to be the phone class distribution at the current node. Subsequently, to determine whether a phone can occur in a specified time interval, the probability of the phone, as predicted by the decision tree over this interval, is compared to a threshold, and a short-list of allowed phones is constructed. If the predicted probability is larger than the threshold, it is concluded that the phone can occur at that time, and if not, then the phone cannot occur at that time. The subsequent search of the decoder is constrained to this short list, rather than the space of the entire phone alphabet.

This information is used in the maximum likelihood framework to determine whether to carry out a match for a given word. Before carrying out the match for a given phone in a word, the above defined measure is checked to see if the phone can possibly occur at the given time, and if the measure predicts that it cannot, then the match for the current word is discarded.

The method and apparatus according to the invention are advantageous because they provide a fast and accurate way of estimating a-posteriori phone probabilities, using a decision tree, that is capable of taking the surrounding acoustic context into account. The method is very fast, as the questions asked in the decision tree simply involve the set membership of the selected predictor.

The invention also describes a technique where the phone probabilities so calculated can be used to reduce the complexity of the speech recognizer by cutting down its search space.

FIGURES

FIG. 1 is a flow chart depicting the procedure for constructing a decision tree to predict the probability distribution of a phone class at a given time, in accordance with the invention.

DETAILED DESCRIPTION OF THE PREFERRED EMBODIMENTS

FIG. 1 is a flow chart depicting the procedure to construct a decision tree to predict a probability distribution of phone classes at time t, given the quantized feature vectors at times t−N, t−N+1, ..., t, ... t+N. For the purpose of explaining the working of the invention, the quantized feature vectors will henceforth be referred to as labels. The predictors used in the decision tree are the labels at times t−N, ..., t, ..., t+N, represented as $l^{-N}, \ldots, l^0, \ldots l^{+N}$, and the predicted quantity is a distribution of the phone classes at time t. The size of the phone alphabet is denoted as P, and the size of the label alphabet as L. Typically, P ranges from 50–100, and L is in the 100's; however, for the purpose of explaining the invention, we will assume that L=4, P=3, and N=1. We will represent these four predictor values as $l_1, l_2, l_3$, and $l_4$, and the three class values as $p_1, p_2$, and $p_3$.

The training data consists of a number of transcribed sentences, with the acoustic corresponding to each sentence being quantized into a sequence of labels. Further, as the data is transcribed (FIG. 1, Block 100), it is also possible to assign a phone to every time frame.

If the event $(l_i^k, p)$ is defined as one where the value of the predictor $l^k$ is equal to $l_i$ and the phone class value is equal to p, then a confusion matrix is created (FIG. 1, Block 102), which enumerates the counts of all possible events $(l_i^k, p)$. The matrix has L rows, and P columns, and the entry corresponding to the $i^{th}$ row and the $j^{th}$ column represents the number of times the value of the predictor $l^k$ equalled $l_i$, when the class value equalled $p_j$, in the training data at the current node of the decision tree (at the root node, all the training data is used). These counts are then converted into joint probabilities by computing the sum of all entries in the matrix, and then dividing each entry of the matrix by this sum. As there are 2N+1 predictors, 2N+1 joint distribution matrices can be created, one for each predictor. An example of these joint distribution matrices is shown in Tables 1(a)–1(c), for the case of three predictors $l^{-1}, l^0$ and $l^{+1}$.

TABLE 1(a)

| $l^{-1}$ | $p_1$ | $p_2$ | $p_3$ |
|---|---|---|---|
| $l_1$ | 0.1 | 0.067 | 0.033 |
| $l_2$ | 0.067 | 0.167 | 0.033 |
| $l_3$ | 0.133 | 0.033 | 0.1 |
| $l_4$ | 0.033 | 0.067 | 0.167 |

TABLE 1(b)

| $l^0$ | $p_1$ | $p_2$ | $p_3$ |
|---|---|---|---|
| $l_1$ | 0.133 | 0.05 | 0.033 |
| $l_2$ | 0.067 | 0.2 | 0.034 |
| $l_3$ | 0.1 | 0.034 | 0.067 |
| $l_4$ | 0.033 | 0.05 | 0.2 |

TABLE 1(c)

| $l^{+1}$ | $p_1$ | $p_2$ | $p_3$ |
|---|---|---|---|
| $l_1$ | 0.117 | 0.05 | 0.033 |
| $l_2$ | 0.067 | 0.167 | 0.033 |
| $l_3$ | 0.116 | 0.05 | 0.1 |
| $l_4$ | 0.033 | 0.067 | 0.167 |

The class distribution at the current node and its entropy is computed and stored at this point. The class distribution is obtained by summing up the rows of any one of the 2N+1 joint distribution matrices, i.e., $$Pr(p = p_k) = \sum_{j=1}^{4} Pr(l^k = l_j, p = p_k),$$

and the entropy of the class distribution is obtained as $$H(p) = \sum_{i=1}^{3} -Pr(p = p_i)\log_2[Pr(p = p_i)]$$

For the considered example, the class distribution and its entropy is given in Table 2.

TABLE 2

|  | $p_1$ | $p_2$ | $p_3$ |
|---|---|---|---|
| Pr | 0.333 | 0.334 | 0.333 |

$H(p) = 1.58$

In Block 103, we start with the joint distribution of the $t^{th}$ predictor, $l^k$, and the class p, and design a binary partitioning $SL_{opt}^k, \overline{SL}_{opt}^k$, of the values of the predictor $l^k$ using the method of Nadas. In other words, for each predictor, the predictor alphabet $[l_1, l_2, l_3, l_4]$ is partitioned into two complementary sets, $SL_{opt}^k$ and $\overline{SL}_{opt}^k$, (for example, $SL_{opt}^k=[l_1, l_2]$, and $\overline{SL}_{opt}^k=[l_3, l_4]$, with the criterion for the selection of the partition being the minimization of the class uncertainty. The entropy of the class distribution is used as a measure of the uncertainty. The details of this method are given in Nadas. This process is carried out for each predictor independently. For the considered example, one iteration of the procedure in Nadas, col 4, line 30 col 9, line 25], leads to a nearly optimal partitioning of the different predictors as follows:

$$SL_{opt}^{-1}=[l_1,l_2], \overline{SL}_{opt}^{-1}=[l_3,l_4], SL_{opt}^0=[l_1,l_2,l_3],$$
$$\overline{SL}_{opt}^0=[l_4], SL_{opt}^{+1}=[l_1,l_2] \text{ and } \overline{SL}_{opt}^{+1}=[l_3,l_4].$$

Now, for each one of the predictors $l^k$, the training data at the current node may be split into two parts based on the partitioning $SL_{opt}^k, \overline{SL}_{opt}^k$, and the probability of these two child nodes is given as $$Pr(SL_{opt}^k) = \sum_{k=1}^{3} \sum_{l_j \in SL_{opt}^k} Pr(l^k = l_j, p = p_k),$$

and $$Pr(\overline{SL}_{opt}^k) = \sum_{k=1}^{3} \sum_{l_j \in \overline{SL}_{opt}^k} Pr(l^k = l_j, p = p_k).$$

Further, the class distribution conditioned on the partitioning at the two child nodes may be calculated as follows $$Pr(p = p_m/SL_{opt}^k) = \sum_{l_j \in SL_{opt}^k} Pr(l^k = l_j, p = p_m)/Pr(SL_{opt}^k)$$

and $$Pr(p = p_m/\overline{SL}_{opt}^k) = \sum_{l_j \in \overline{SL}_{opt}^k} Pr(l^k = l_j, p = p_m)/Pr(\overline{SL}_{opt}^k).$$

The entropy for each of these child nodes can be calculated just as for the parent node and the average entropy for the two child nodes computed as $$H_{avg}^k = Pr(SL_{opt}^k)H(p/SL_{opt}^k) + Pr(\overline{SL}_{opt}^k)H(p/\overline{SL}_{opt}^k).$$

For the considered example, these quantities are tabulated in Table 3.

|  | $p_1$ | $p_2$ | $p_3$ |
|---|---|---|---|
| $Pr(p/SL_{opt}^{-1})$ | 0.358 | 0.5 | 0.142 |
| $Pr(p/\overline{SL}_{opt}^{-1})$ | 0.312 | 0.188 | 0.5 |
| $Pr(p/SL_{opt}^{0})$ | 0.418 | 0.396 | 0.187 |
| $Pr(p/\overline{SL}_{opt}^{0})$ | 0.117 | 0.177 | 0.707 |
| $Pr(p/SL_{opt}^{+1})$ | 0.394 | 0.465 | 0.141 |
| $Pr(p/\overline{SL}_{opt}^{+1})$ | 0.28 | 0.22 | 0.5 |

$Pr(SL_{opt}^{-1}) = 0.467 \; Pr(\overline{SL}_{opt}^{-1}) = 0.533$ $H(p/SL_{opt}^{-1}) = 1.43 \; H(p/\overline{SL}_{opt}^{-1}) = 1.477 \; H_{avg}^{-1} = 1.455$ $Pr(SL_{opt}^{0}) = 0.717 \; Pr(\overline{SL}_{opt}^{0}) = 0.283$ $H(p/SL_{opt}^{0}) = 1.508 \; H(p/\overline{SL}_{opt}^{0}) = 1.158 \; H_{avg}^{0} = 1.409$ $Pr(SL_{opt}^{+1}) = 0.467 \; Pr(\overline{SL}_{opt}^{+1}) = 0.533$ $H(p/SL_{opt}^{+1}) = 1.442 \; H(p/\overline{SL}_{opt}^{+1}) = 1.495 \; H_{avg}^{+1} = 1.470$ In Block 104 of FIG. 1, the reduction in class uncertainty associated with the best question for each predictor is tabulated, and the predictor providing the largest reduction in uncertainty is selected. The reduction in uncertainty due to a partitioning based on $SL_{opt}^k$ is computed as $H(p) - H_{avg}^k$. For the considered example, we have $H(p)=1.58$, $H_{avg}^{-1}=1.455$, $H_{avg}^{0}=1.409$ and $H_{avg}^{+1}=1.470$. Hence, the selected predictor is 1°, as this gives the maximum reduction in the uncertainty of the predicted class.

In Block 5, the training data at the current node is partitioned into two parts on the basis of the optimal partitioning of the selected predictor at the current node.

Subsequently, depending on the class uncertainty and the amount of training data at a child node, the process goes back to Block 2, and starts again by recomputing the joint distribution on the basis of only the training data at the child node. The processing at a child node terminates when the class uncertainty at the child node falls below a specified threshold, or if the amount of training data at a child node falls below a specified threshold.

Figure 2:
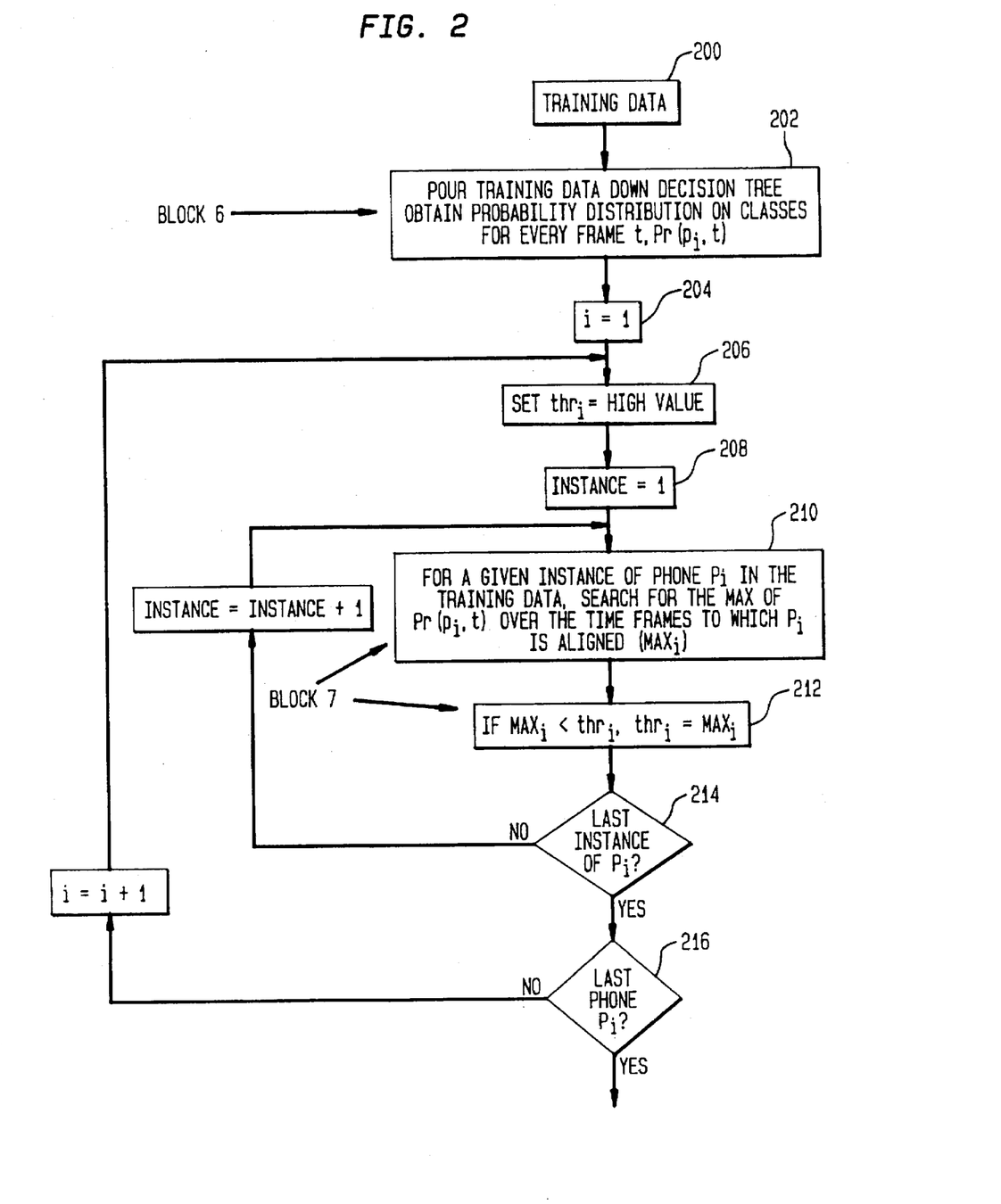
FIG. 2 is a flow chart describing a method of obtaining probability thresholds subsequently used by a speech recognizer.

FIG. 2 is a flow chart describing a method of obtaining the probability thresholds, which are subsequently used in the speech recognizer. Given a stream of labels to be decoded, the object of the invention is to use the decision tree to predict a short-list of phones at every frame. Once this short-list is created, the subsequent search in the decoder is constrained to this short-list of phones, rather than the entire phone alphabet. This greatly reduces the computational complexity of the acoustic search by reducing the search space.

The thresholds are obtained during the training process. The training data is gathered at block 200 of FIG. 2. Beginning at 202 of FIG. 2, for every time frame of every sentence in the training data, the decision tree is traversed, using the label at the current time and the labels at the adjacent times as the predictors, until the traversal terminates in a node. The probability distribution on the phone classes at that current time frame, $Pr(p_i,t)$, is then taken to be the stored distribution at the node of the tree.

Referring now to the flow chart of FIG. 2, the variable i is set initially to 1. (Block 204) The thresholds for the various phones are initially set at some high value, block 206, and the variable "instance" is set to 1, block 208.

Now, any phone in the alphabet occurs several times in the training data, and every one of these instances of a particular phone is typically aligned to several time frames in the training data. The probability of phone $p_i$ predicted by the decision tree over these time frames is searched for its maximum value, Block 210, and the minimum of these maximum values over all instances of the phone $p_i$ in the training data is used as the threshold for $p_i$ (Block 212). Note that rather than obtaining a threshold for a phone $p_i$, an alternative embodiment of the invention allows the obtaining of thresholds for combinations of phones (diphones, triphones etc.), that enable the decision tree to predict whether a particular diphone or triphone, rather than a phone, can occur at a frame.

The process of blocks 210 and 212 repeats until all instances of a particular phone have been considered (Block 214). The process of Blocks 206–214 repeats until each possible phone has been analyzed (Block 216).

Once the thresholds have been determined, they are used during speech recognition by comparing the probability predicted by the decision tree to the threshold, and deciding on the basis of this, whether or not a phone is possible at a given frame. The decoder restricts its search to the space of possible phones only, rather than considering all phones in the alphabet.

Figure 3:
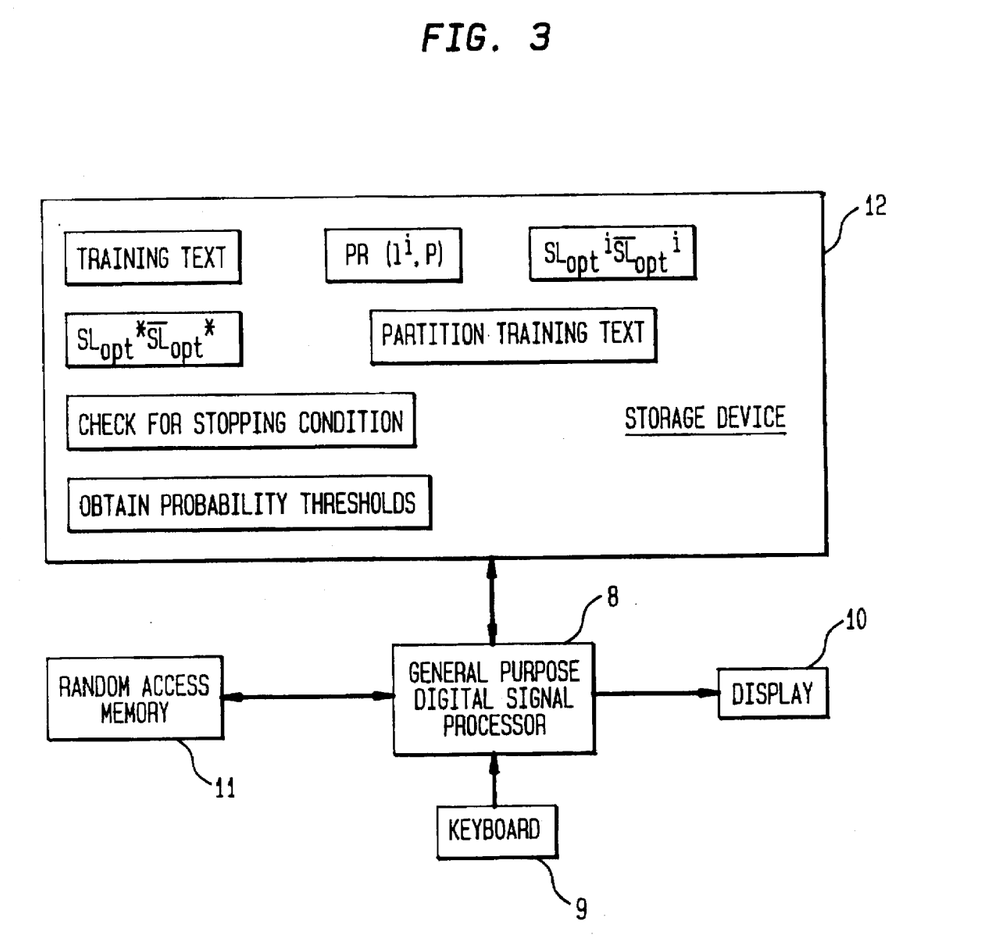
FIG. 3 is a schematic of a preferred apparatus for constructing a decision tree and obtaining probability thresholds in accordance with the invention.

FIG. 3 schematically shows a preferred apparatus for constructing the decision tree and obtaining the probability thresholds. The apparatus may comprise, for example, an appropriately programmed computer system. In this example, the apparatus comprises a general purpose digital processor 8 having a data entry keyboard 9, a display 10, a random access memory 11, and a storage device 12. From the training data, processor 8 computes the joint distribution of the predictor $l^k$ and the phone p, for all 2N+1 predictors, using all of the training data, and stores the estimated joint distribution, along with the class distribution, in storage device 12.

Next, processor 8 computes the best partitioning of each of the predictor values such that the maximum reduction in class uncertainty is obtained due to the partitioning, according to the algorithm of Nadas. Then processor 8 chooses the best predictor, l*, and partitions the training data into two child nodes based on the best partitioning for the predictor l*.

Still under the control of the program, the processor 10 repeats the above procedure for the data at each of the two child nodes, until the class entropy at the node falls below a specified threshold, or until the amount of training data at a node falls below a specified threshold.

After the decision tree is grown, still under control of the program, the processor computes a distribution on phone classes for every frame of the training data, based on the decision tree, and stores it in storage device 12. It also stores some initial specified values of the thresholds for the various phones in storage device 12.

Next, for every instance of a given phone, $p_i$, in the phone alphabet, the processor searches for the maximum predicted probability of phone $p_i$ over the time frames that the current instance of $p_i$ has been aligned to, and replaces the current threshold of phone $p_i$ by this quantity, if it is less than the current threshold.

Figure 4:
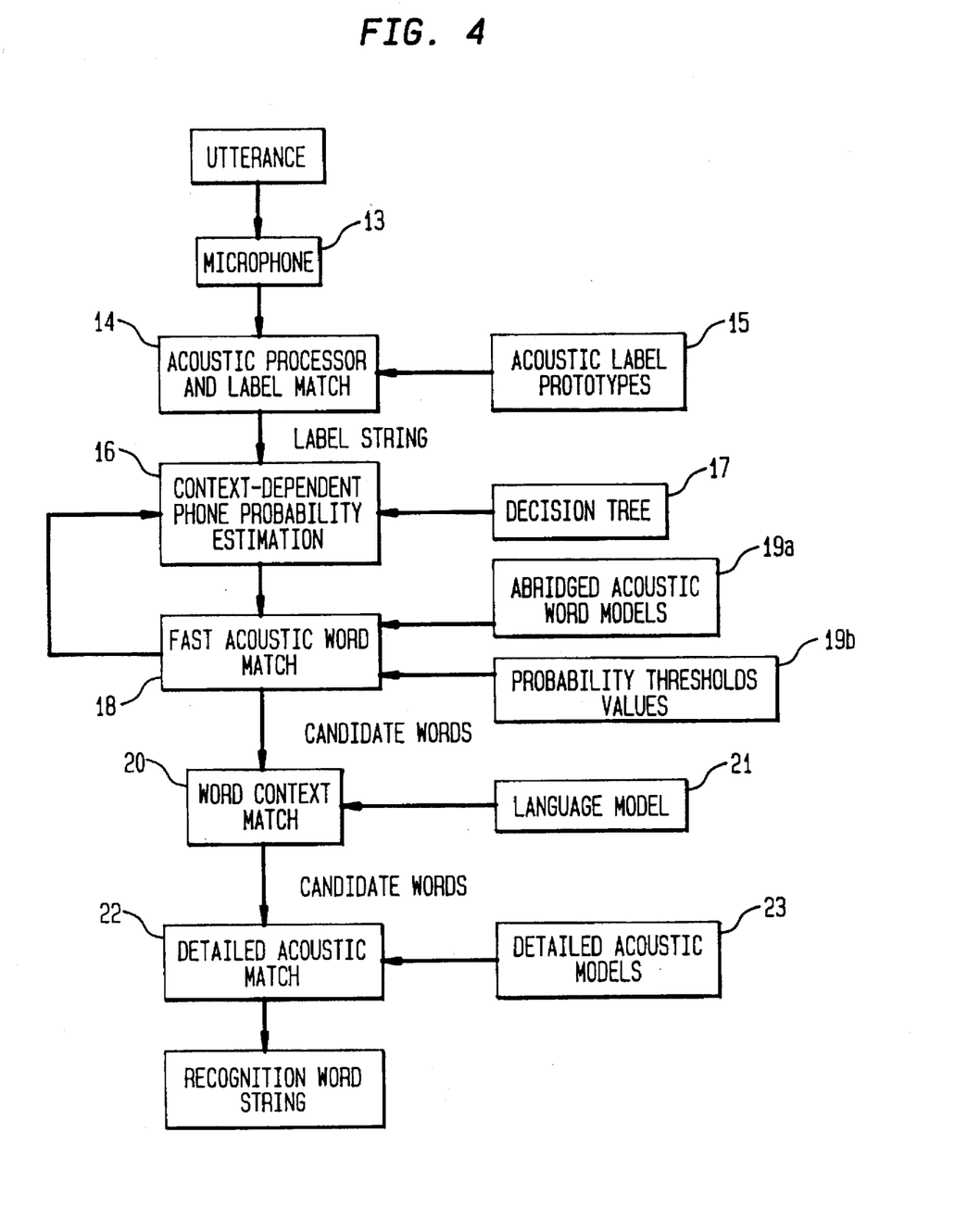
FIG. 4 is a block diagram of an automatic speech recognition system using a decision tree according to the invention.

FIG. 4 is a block diagram of an automatic speech recognition system which utilizes the decision tree according to the present invention. A suitable system is also described, for example, in Nadas. The system in FIG. 4 includes a microphone 13 for converting an utterance into an electrical signal. The signal from the microphone is processed by an acoustic processor and label match 14 which finds the best-matched acoustic label prototype from the acoustic label prototype store 15. A probability distribution of phone classes 16 is then produced for every time frame using the decision tree described in the invention. These probabilities are used in conjunction with the probability thresholds 19 to select a subset of acoustic word models in store 19, and a fast acoustic word match processor 18 matches the label string from the acoustic processor 14 against this subset of abridged acoustic word models to produce an utterance signal.

The utterance signal output by the fast acoustic word match processor comprises at least one word. In general, however, the fast acoustic word match processor will output a number of candidate words.

Each word signal produced by the fast acoustic word match processor 18 is input into a word context match 20 which compares the word context to language models in store 21 and outputs at least one candidate word. From the recognition candidates produced by the fast acoustic match and the language model, the detailed acoustic match 22 matches the label string from the acoustic processor 14 against detailed acoustic word models in store 23 and outputs a word string corresponding to an utterance.

Given the acoustic label string from the acoustic processor 14, the context-dependent phone probability estimator 24 traverses the decision tree 25 for every time frame using the label at the current time and the labels in the adjacent times as the predictors, until it reaches a terminal node of the tree. Then the stored class distribution at that node is stored as the class distribution at the current time. These probabilities are used by the fast acoustic word match to decide whether a phone is possible at a given time.

The abridged acoustic word models in store 19a model a word as a sequence of phones and the fast acoustic word match processor 18 computes a score for each phone in the sequence for a word by computing that match between the labels produced by acoustic processor 14 and the phone. The number of such matches that have to be computed can be reduced by using the phone probabilities 16 to prune out a number of words. The probabilities predicted by the decision tree are searched for their maximum over the time frames corresponding to the hypothesized end time of the previous phone of the word (for which a fast match score was computed), and this maximum is compared to the threshold for the phone (or diphone, triphone etc.). If the maximum is less than the threshold, then it is hypothesized that the phone cannot occur in that interval, and the current word is discarded, i.e., the fast match computation is not done for the remainder of the word. Other measures rather than the maximum could also be used (such as the sum of the probabilities of the phone over the specified time interval, etc.), with the thresholds being adjusted accordingly.

We claim:

1. A method of recognizing speech, comprising:
    (a) inputting a set of training data comprising a plurality of records, each record of the training data comprising a sequence of 2K+1 feature vectors and a member of the class, each feature vector being represented by a label;
    (b) forming a binary decision tree, the tree comprising a root node and a plurality of child nodes each associated with a binary question, the tree terminating in a plurality of terminal nodes, wherein the step of forming the trees comprises:
        (i) for each index t in the sequence of feature vectors, wherein the index t refers to the $t^{th}$ label in the sequence of 2K+1 labels in a training record, dividing the labels at each of indexes t−K, . . . , t, . . . t+K, into pairs of sets, respectively, wherein the labels at each of the indexes are divided so as to minimize entropy of the classes associated with the pairs of sets;
        (ii) selecting from the pairs of sets a lowest entropy pair;
        (iii) generating a binary question and assigning it to the node, wherein the question asks whether a label to be classified, occurring at index T corresponding to the index of the lowest entropy pair, is a member of the first set or the second set;
    (c) partitioning the data at the current node into two child nodes in accordance with this question;
    (d) repeating steps (b)(i)–(b)(iii) for each child node;
    (e) for each child node, computing a probability distribution of the occurrence of the class members, given the members of the set of labels at that node;
    inputting a sequence of speech to be recognized;
    traversing the binary decision tree for every time frame of an input sequence of speech to determine a distribution of most likely phones for each time frame, the most likely phones for each time frame collectively forming a phone sequence;
    outputting a recognition result based upon the distribution of most likely phones.

2. The method of claim 1, further comprising:
    providing a set of sampled data comprising a second plurality of feature vectors;
    comparing each of the second plurality of feature vectors with prototypes characterizing the training data and assigning each of the second plurality of feature vectors a label corresponding to the label of the prototype which it most closely matches.

3. The method of claim 2, further comprising finding a phone distribution for the labelled sample feature vector at the index t, comprising the steps of:

(f) constructing a sequence of 2K+1 vectors comprising the labels at times t−K . . . . t, . . . , t+K;

(g) starting at the root of the decision tree, determining which of the pair of sets at each node the sampled label at time t+k belongs to, where k is specified by the question at the current node of the decision tree;

(h) following a branch of the tree to one of the child nodes based upon the results of the determination;

(i) repeating steps (g) and (h) at each child node until a leaf is reached, and storing the class distribution of the leaf.

4. The method of claim 1, further comprising:

selecting from the pairs of sets further pairs that, with the first selected pair, further reduces the entropy of the class distribution at the child node; and assigning those further pairs of sets to the node as the question.

5. A method for recognizing speech, comprising:

(a) providing a set of records, the records comprising 2k+1 labels $l^k$, for k=−K . . . K, representing feature vectors at time t+k, where t is the current time, and a size of the label alphabet is i;

(b) mapping each of the labels $l^k$ to a class value at time t;

(c) generating a confusion matrix for each $l^k$, each confusion matrix plotting a distribution of the class values for each value of the label $l^k$;

(d) computing, based on the confusion matrices, a class distribution at a present node of a binary decision tree by summing probabilities of each class member $p_j$ for the i values that $l^k$ can take, and dividing the probabilities by the sum;

(e) finding a minimum entropy split of the i values for each $l^k$ based on the computed class distribution, comprising the steps of:

for each $l^k$ at times −K . . . K, splitting the set of values that $l^k$ can take into two sets, so as to minimize entropy of the class distribution conditioned on the split;

calculating the class distribution for each of the child nodes resulting from the split;

selecting the label $l^k$ that provides the largest reduction in uncertainty at that node, and assigning the split computed for $l^k$ as the binary question at that node;

partitioning the training data at the current node based on the minimum entropy split of the selected label $l^k$ at the current node;

repeating step (e) for each child node;

inputting a sequence of speech to be recognized;

traversing the binary decision tree for every time frame of an input sequence of speech to determine a distribution of most likely phones for each time frame, the most likely phones for each time frame collectively forming a phone sequence;

outputting a recognition result based upon the distribution of most likely phones.

6. A method of recognizing speech, comprising:

inputting a plurality of words of training data;

training one or more binary decision trees to ask a maximally informative question at each node based upon preceding and subsequent contextual information in the training data, wherein each binary decision tree corresponds to a different time in a sequence of the training data;

traversing one of the decision trees for every time frame of an input sequence of speech to determine a distribution of most likely phones for every time frame, the most likely phones for each time frame collectively forming a phone sequence;

outputting a recognition result based upon the distribution of most likely phones.

7. The method of claim 6, wherein each binary tree has a root node and a plurality of child nodes, and wherein the step of training the binary decision trees comprises:

(a) constructing records comprising sequences of 2K+1 labels and one phone class where the K labels represent training samples at time t−K . . . . t, . . . t+k, and a phone class represents the class at time t in the training data;

(b) assigning an index to each record of the training data, where the index goes from −K . . . K, corresponding to the 2K+1 labels in the record;

(c) dividing the labels at each of times −K . . . K into pairs of disjoint sets, respectively, so as to minimize an average entropy of the phone classes associated with the disjoint sets;

(d) assigning a question to the root node based on the pair of disjoint sets having the lowest entropy, the lowest entropy pair of sets occurring at index T, wherein the question asks whether an input sequence label at index T is a member of a first set in the lowest entropy pair of disjoint sets, and wherein the split formed by the question yields two child nodes;

(d) repeating steps (b) and (c) for the training data at each child node to generate child node questions;

(e) terminating the training when the number of labels at a node is less than a predetermined threshold.

8. The method of claim 6, wherein the step of determining a distribution of most likely matches comprises:

eliminating from the list of most likely phones at a given time each phone having a probability less than a threshold;

comparing combinations of phones above the threshold with phonetic baseforms of words in a vocabulary to determine a most probable word match for the input sequence of speech.

9. The method of claim 8, further comprising comparing combinations of the remaining phones with a language model to determine a most probable word match for the input sequence of speech.

10. A method for recognizing speech, comprising:

(a) entering a string of utterances constituting training data;

(b) converting the utterances of the training data to electrical signals;

(c) representing the electrical signals of the training data as prototype quantized feature vectors, one feature vector representing a given time frame;

(d) assigning to each prototype feature vector a class label associated with the prototype quantized feature vector;

(e) forming one or more binary decision trees for different times in the training data, each tree having a root node and a plurality of child nodes, comprising the steps of:

creating a set of training records comprising 2K+1 predictors, $l^k$, and one predicted class, p, where the 2K+1 predictors are feature vector labels at 2K+1 consecutive times t−K, . . . , t, . . . , t+K, and the predicted class is a phone at time t in the training data;

computing an estimated joint distribution of predictors $l^k$ and phone p for 2K+1 predictors using the training data, wherein the predictors are feature vector labels at times t-K ... t, ... , t+K and p is the phone at time t;

storing the estimated joint distribution of $l^k$ and p and a corresponding phone distribution for each predictor $l^k$ at the root node;

computing the best partitioning of the distribution of predictor $l^k$ for each $l^k$ to minimize phone uncertainty at each node;

choosing the partitioned distribution of predictors $l^k$ having the lowest uncertainty and partitioning the training data into two child nodes based on the partitioning, each child node being assigned a phone distribution based on the training data at the child node;

(f) repeating step (e) for each child node if the amount of training data at the child node is greater than a threshold;

(g) inputting an utterance to be recognized;

(h) converting the utterance into an electrical signal;

(i) representing the electrical signal as a series of quantized feature vectors;

(j) matching the series of quantized feature vectors against the stored prototype feature vectors to determine a closest match and assigning an input label to each of the series of feature vectors corresponding to the label of the closet matching prototype feature vector;

(k) traversing the decision trees for each input label to determine a distribution of phone probabilities for each label.

11. A method of recognizing speech using a decision tree for predicting a distribution of phone classes based on 2K+1 predictors, comprising:

creating a set of training records comprising 2K+1 predictors, $l^k$, and one predicted class, p, where the 2K+1 predictors are feature vector labels at 2K+1 consecutive times t-K, ... , t, ... , t+K, and the predicted class is a phone at time t in the training data;

inputting a set of training labels $l^{-N}$, ... ,l, ... ,$l^{-N}$ occurring at times $t^{-N}$, ... ,t, ... ,$t^{+N}$, and phone class occurring at time t;

computing a joint probabilities of events $(l_i^k,p)$, when the value of predictor $l^k$ equals $l_i$, and the phone class value is p;

computing the class distributions $Pr(p=p^k)$ for the current nodes by $$Pr(p = p_k) = \sum_{j=i}^{L} Pr(l^k = l_j, p = p_k);$$

computing an entropy H(p) of a class distribution by $$H(p) = \sum_{i=1}^{l} -Pr(p = p_i)\log_2[Pr(p = p_i)];$$

partitioning each predictor $l^k$ into two complementary sets $SL_{opt}^k$ and $\overline{SL}_{opt}^k$ so as to minimize average class entropy;

splitting the training data at a current node of the tree based on the partitioning $SL_{opt}^k$, $\overline{SL}_{opt}^k$, and computing the probabilities of the child nodes by $$Pr(SL_{opt}^k) = \sum_{k=1}^{l} \sum_{l_j \in SL_{opt}^k} Pr(l^k = l_j, p = p_k),$$

and $$Pr(\overline{SL}_{opt}^k) = \sum_{k=1}^{l} \sum_{l_j \in \overline{SL}_{opt}^k} Pr(l^k = l_j, p = p_k);$$

computing the class distribution at the child nodes conditional on the splitting by $$Pr(p = p_m/SL_{opt}^k) = \sum_{l_j \in SL_{opt}^k} Pr(l^k = l_j, p = p_m)/Pr(SL_{opt}^k),$$

and $$Pr(p = p_m/\overline{SL}_{opt}^k) = \sum_{l_j \in \overline{SL}_{opt}^k} Pr(l^k = l_j, p = p_m)/PR(\overline{SL}_{opt}^k);$$

computing the average entropy for the child nodes by $$H_{avg}^k = Pr(SL_{opt}^k)H(p/SL_{opt}^k) + Pr(\overline{SL}_{opt}^k)H(p/\overline{SL}_{opt}^k);$$

determining the reduction in class uncertainty for each predictor $l^k$ by $H(p)-H_{avg}^k$;

selecting the predictor and partition leading to the maximum reduction in uncertainty;

partitioning the set of training labels based on the selected partition;

partitioning the labels at a child node in accordance with the foregoing steps;

inputting a sequence of speech to be recognized;

traversing the decision tree for every time frame of an input sequence of speech to determine a distribution of most likely phones for each time frame, the most likely phones for each time frame collectively forming a phone sequence;

outputting a recognition result based upon the distribution of most likely phones.

* * * * *